June 30, 1936.    R. J. PLAISTED    2,045,994
POWER CONTROLLED WIND INDICATOR
Filed Jan. 6, 1933
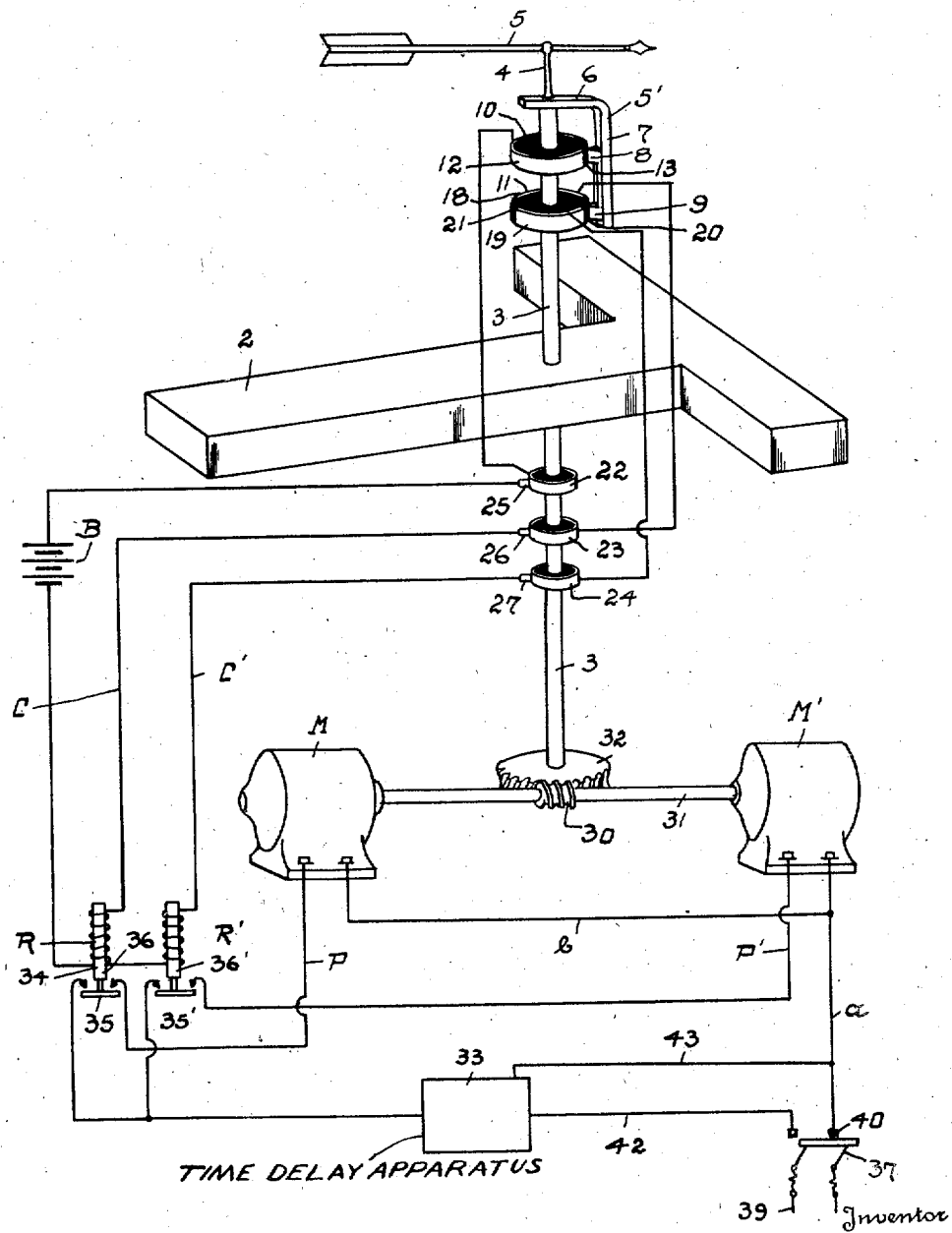
ROSS J. PLAISTED
By Fisher, Moser + Moore
Attorney Patented June 30, 1936

2,045,994

UNITED STATES PATENT OFFICE 2,045,994

POWER CONTROLLED WIND INDICATOR

Ross J. Plaisted, Cleveland, Ohio

Application January 6, 1933, Serial No. 650,552

2 Claims. (Cl. 177—352)

This invention relates to power controlling means generally and more particularly to power controlling means for wind indicators of substantial size and weight, such as used in air ports for indicating the direction of ground winds. Such wind indicators are necessarily very large, in order that they may be readily seen by pilots of incoming airships in determining the proper course to take in landing, and in consequence of their size are deficient in sensitiveness and accuracy of indication for wind velocities, of insufficient strength to turn the indicators.

The general object of the present invention is to provide controlling means for automatically controlling power circuits in turn independently operating power means for actuating moving parts.

Another object is to provide controlling circuits for automatic control of power circuits in turn independently operating power means for actuating moving parts, the power circuits including time delay means for retarding the actuation of said moving parts with respect to the actuation of said controlling circuits.

Another object of the present invention is to provide a large sized wind indicator of maximum sensitiveness and accuracy for practically all wind velocities.

Another object is to provide a power operated wind indicator with a small power controlling pilot vane, which controls the movement of the main indicator and thus insures accurate direction indication at all wind velocities sufficiently high to turn the pilot vane.

A further object is to provide a pilot vane controlled power operated wind indicator with means governed by the pilot vane for turning the indicator parallel to the pilot vane.

Still another object is to provide a pilot vane controlled power operated wind indicator with a plurality of controlling and power circuits for turning the indicator in opposite directions, wherein the controlling and power circuits are governed and controlled by the pilot vane.

A still further object is the provision of automatically actuated retarding means which prevents those oscillations of the pilot caused by wind puffs from communicating corresponding oscillations in a movement of the main wind indicator.

Still another object is the adjustment of the retarding means to the weather conditions, such as wind velocities, temperatures, air pressures, etc.

With the foregoing and other objects in view, which will be understood as the description proceeds, my invention consists in the combination and parts described and claimed in the following specification and illustrated in the accompanying drawing wherein:

The figure is a diagrammatic view of a pilot vane controlled power operated wind indicator, showing the diagrams of the electric circuits for rotating the main indicator and the controlling circuits controlled by the pilot vane.

In the diagrammatically shown embodiment selected for purposes of illustration, reference numeral 2 denotes a main wind indicator of T shape which is rigidly mounted upon a vertically disposed hollow shaft or tubing 3, extending through said indicator and rotatably supported in any known manner to permit joint rotation of wind indicator 2 and shaft 3. A short shaft 4, carrying at its upper end a small pilot vane 5, is mounted at its lower end upon the upper end of hollow shaft 3, for relative rotary movement with respect to indicator 2 and said shaft 3. A bracket 5' having a horizontally disposed arm 6 fixed to the pilot vane shaft 4, has a depending vertical arm 7 provided with two contact brushes 8 and 9, which engage with metal contacts mounted on the periphery of a pair of spaced commutator rings 10 and 11, fixed to and insulated from shaft 3. The electrical contact surface of commutator ring 10 consists of a split upper ring 12, the opposite ends of which are spaced and insulated from each other to form an insulating gap 13, slightly wider than contact brush 8, thus permitting brush 8 to rest thereon without contacting with either end of the split ring, and the contact of commutator ring 11 consists of two approximately half circular copper segments 18 and 19, so spaced with respect to each other as to form insulating gaps 20 and 21, sufficiently wide to permit brush 9 to rest thereon without contacting with segments 18 and/or 19. Split ring 12 is electrically connected to an insulated collector ring 22 on shaft 3 and segments 18 and 19 are electrically connected with insulated collector rings 23 and 24 on shaft 3. The electrical connections between commutator rings 10 and 11 and collector rings 22, 23 and 24 may be carried through shaft 3 for sake of simplicity, if so desired.

Collector rings 22, 23 and 24 are connected by brushes 25, 26 and 27 with two controlling circuits C and C', each of which embodies a control relay R, R' respectively, which relays control power circuits P and P' respectively. These power circuits, when under current, energize oppositely rotating motors M and M', in direct driving connection with the main indicator 2 by means of a worm 30, secured to a shaft 31, common to both motors, and a worm gear 32, mounted on shaft 3, which causes the shaft 3 and main indicator 2 to be rotated either in a clockwise or counterclockwise direction, according to which motor is operative. Power circuits P, P' are controlled by a time delay unit 33, which delays closing of said circuits for a purpose hereinafter described.

The operation, use and advantages of the device are as follows: When, for example, the pilot vane shaft 4, and its vane 5 is turned by the prevailing wind in counter-clockwise direction with respect to the main wind indicator 2, the contact brush 8 is caused to move from its normal contact with insulating gap 13, to engagement with split metal ring 12, and contact brush 9 is caused to move from its normal contact with insulating gap 20 to engagement with the half circular metal strip 19. This movement of brushes 8 and 9 closes the control circuit C, so that current flows from battery B, to and through control relay R, brush 26, collector ring 23, metal strip 18, brush 9, brush 8, metal ring 12, and hence through collector ring 22 and its brush 25 back to battery B. This current, while flowing through control relay R energizes its electromagnet 34, so that armature 36 will be picked up and switch 35, coupled with said armature, will be closed. This switch controls the power circuit P which is fed from the main line over a switch 37, and when closed effects rotation of counter-clockwise rotating motor M, by current flowing from main line 39, through switch contact 40 over lines a and b to motor M, and thence over switch 35 and a time delay apparatus 33 back to the main line. Motor M rotates shaft 3, the main wind indicator 2 and commutator rings 10 and 11, until the brushes 8 and 9 reach the insulating gaps 13 and 20 respectively and interrupt the current in control circuit C, thus causing the armature 36 of relay R to drop and open circuit P, and in turn stopping rotation of motor M, shaft 3, indicator 2 and commutator rings 10 and 11.

It can now be seen, that pilot vane 5, when rotated in clockwise direction with respect to main wind indicator 2 will shift contact brush 8 into contact with split ring 12, and contact brush 9 into contact with metal strip 19 on commutator ring 11, and that the current then flowing in circuit C', closes switch 35' by means of control relay R', which switch controls the power circuit P'. This circuit P' includes the clockwise rotating motor M', which will revolve until control circuit C' is opened and cuts off the flow of current in power circuit P', by releasing armature 36' of control relay R'.

Preferably contact brush holder 6 and commutator rings 10 and 11 are so attached to their respective supports, that contact brushes 8 and 9 engage the insulating gaps 13 and 20, when the pilot vane 5 and the indicator are parallel with respect to each other, so that the indicator follows and stops in perfect alignment with the pilot vane.

Oscillation or hunting between the pilot vane 5 and the main indicator 2 is prevented by the time delay unit 33, which controls the current flow in the power circuits P and P' and causes a delay in fully energizing said circuits. A practical time delay unit is diagrammatically shown in Figures 3 and 4. The purpose of the time delay unit is to delay the full current flow in the power circuits and therewith rotation of the motors M and M' for a sufficient interval, to allow the general wind direction to become settled after wind puffs or gusts incident to stormy or windy weather have subsided. Time delay unit 33 is so connected to power circuits P, P' by means of wires 42, 43 that closing of switch 35 or 35' will result in initiation of the desired delay.

What I claim is:

1. In an electric control system and apparatus, a substantially horizontally disposed massive wind direction indicating T supported to rotate in a substantially horizontal plane in either direction, a pilot wind vane supported to oscillate upon a substantially vertical axis in response to slight fluctuations of wind direction, an electric current commutator comprising a pair of circular sector-form contacts insulated from each other disposed coaxial with the T and rotatable therewith, a common return circuit and a pair of contacts supported by the vane oscillatable with the vane into and out of engagement with the sector-form contacts and the common return contact respectively, a pair of motors for rotating the T in opposite directions, a pair of electromagnetic switches each having an operating winding, said switches having contacts respectively controlling the motors, a pair of circuits each connecting one side of one winding to one of the sector-form contacts, a return circuit connecting the other side of both windings to the common return contact, whereby upon engagement of the vane-supported contacts with one or the other of the sector-form contacts and the common return contact, respectively, a corresponding switch winding may be energized, to operate the corresponding switch, to operate the corresponding motor, to turn the T in a corresponding direction, to cause the engaged sector-form contact and common return contact to move out of engagement with the vane-supported contacts.

2. In an electric control system and apparatus, a substantially horizontally disposed massive wind direction indicating T supported to rotate in a substantially horizontal plane in either direction, a pilot wind vane supported to oscillate upon a substantially vertical axis in response to slight fluctuations of wind direction, an electric current controller comprising a communicator element and a brush element, the commutator element comprising a pair of circular sector-form contacts insulated from each other disposed coaxial with the T, the brush element comprising a brush element contact engageable with the sector-form contacts of the commutator element, one element being supported by the vane and oscillatable therewith around the axis of the T, and the other element being supported upon the T and rotatable therewith around the T axis, whereby upon oscillation of the vane the brush element contact may engage and disengage the sector-form contacts, motor means for rotating the T in opposite directions, a pair of electromagnetic switches each having an operating winding, said switches having contacts respectively controlling the direction of rotation of the motor means, a pair of circuits each connecting one side of one winding to one of the sector-form contacts, a return circuit from the said brush element contact to the other side of both windings whereby upon engagement of the brush element contact with one or the other of the sector-form contacts the corresponding switch winding may be energized, to operate the corresponding switch, to effect energization of the motor means in a corresponding direction, to turn the T in the corresponding direction to cause the engaged sector-form contact and the brush element contact to move out of engagement.

ROSS J. PLAISTED.